Nov. 2, 1948.  O. SCHLETT  2,452,688
COMBINATION EMERGENCY WHEEL AND ANTISKID DEVICE
Filed Feb. 9, 1946  2 Sheets-Sheet 1

INVENTOR.
Otto Schlett.
BY
Attorney.

Nov. 2, 1948.     O. SCHLETT     2,452,688
COMBINATION EMERGENCY WHEEL AND ANTISKID DEVICE
Filed Feb. 9, 1946     2 Sheets-Sheet 2
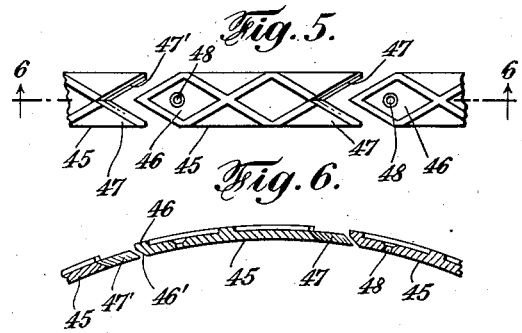
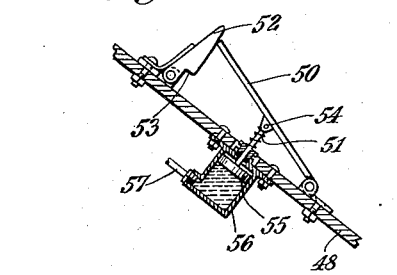
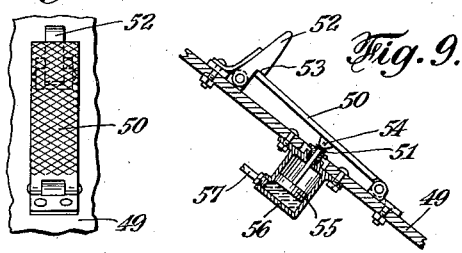
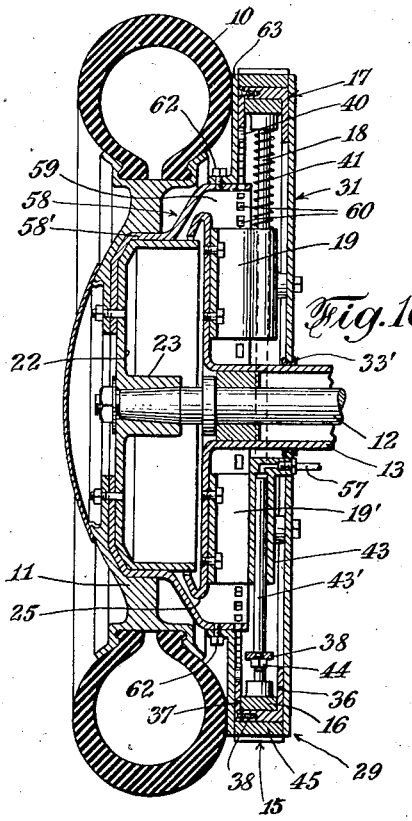
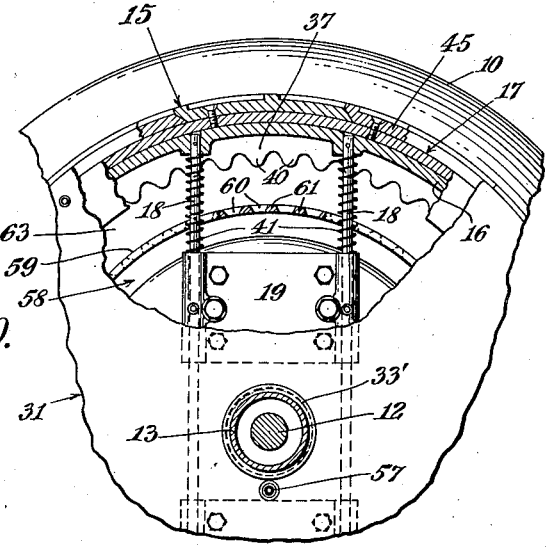
INVENTOR
Otto Schlett.
BY
ATTORNEY Patented Nov. 2, 1948

2,452,688

UNITED STATES PATENT OFFICE 2,452,688

COMBINATION EMERGENCY WHEEL AND ANTISKID DEVICE

Otto Schlett, Woodside, N. Y.

Application February 9, 1946, Serial No. 646,528

8 Claims. (Cl. 301—47)

This invention broadly relates to combination emergency wheels and antiskid devices for vehicles equipped with and supported by wheels such as automobiles, airplanes, etc.

Devices intended to serve as substitutes for snow or skid chains usually employed with vehicle wheels are known in the art, and in most cases are constructed in the form of links, prongs or other similar means for frictionally engaging the road surface normally supporting the tires of the vehicle. However, none of the present-day devices disclose a continuous road-engaging surface which, to at least some degree, will approximate the normal rolling movement of a tire over the road. Furthermore, most of the devices known at present have the disadvantage of lacking provision for excluding foreign matter, such as dirt and dust, from their mechanism, with the result that the operation of the device becomes greatly impaired or made totally impossible when needed most.

Another important disadvantageous feature of such devices may be found in the constructional arrangement of the road-engaging elements which are usually spaced from one another and induce a bumpy operation of the vehicle equipped therewith.

The most undesirable feature of such devices resides in the fact that they continuously rotate with the vehicle wheel, both in their retracted as well as in their road-engaging position. Such continuous movement with the wheel subjects the mechanism to centrifugal force, which is bound to affect the operation of the devices and in addition renders them very noisy.

The present invention contemplates the provision of a combination emergency wheel and antiskid device which is of relatively simple but effective construction, and which is equipped with a continuous road-engaging surface which provides not only antiskid action, but also may readily serve to support the vehicle during extensive runs when the wheel of the vehicle is incapable of supporting the load, for instance, when the tire becomes defective.

Another important feature of the present invention resides in the provision of a virtually dust-proof construction of the device, which prevents the infiltration of foreign matter to the working parts thereof, and wherein means are provided for so supporting the road-engaging working parts as to very nearly approximate the normal rolling movement of a vehicle wheel over its supporting surface.

A still further and very important provision of the present invention is the positive manner whereby the power from the wheel axle is transmitted to the combination emergency wheel and antiskid device, wherein possible slippage or failure of the device to operate during the period it engages the road is virtually eliminated.

Another and very important object of the present invention is the provision of a combination emergency wheel and antiskid device, wherein the road-engaging portion thereof normally assumes a fixed, immovable position in concentricity with the vehicle wheel when the device is not in use, and only then is caused to operate when brought into engagement with the road surface.

Broadly speaking, the device comprises a bodily movable annulus composed of several concentric parts, which, while the device is in its inoperative position, are retained concentrically in respect to the vehicle wheel, and when the device is moved into engagement with the road, assume an eccentric position relative to the wheel, and at the same time receives power from the wheel structure to impart rotary motion to that portion of the annulus which is in engagement with the road. In other words, during normal operation of the vehicle, the present emergency wheel and antiskid device is held in fixed position and does not move with the wheel, but, when emergency arises for its use, it becomes operative as it is brought into engagement with the road surface.

The principle of the present invention and the disclosed typical structural arrangement thereof, intended to serve for explanatory purposes only, will become more fully understood from the following description in conjunction with the accompanying drawings, wherein:

Fig. 5 is a plan view of traction or tread elements employed in the present device;

Fig. 6 is a section taken on line 6—6 of Fig. 5;

Fig. 7 is a foot-control for governing the operation of the device, shown in its released position;

Fig. 8 is a plan view thereof;

Fig. 9 is the foot-control in its depressed position;

Fig. 10 is a section through a modified form of the device, similar to that illustrated in Fig. 4; and Fig. 11 is a fragmental plan view of a portion of the device shown in Fig. 10.

Figure 1:
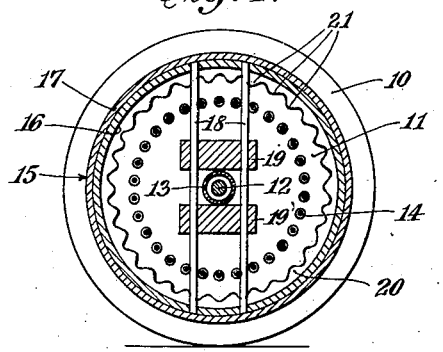
Fig. 1 is a diagram indicating the present device as applied to an existing vehicle wheel, and shown in its inoperative position, concentric with the wheel.
Figure 2:
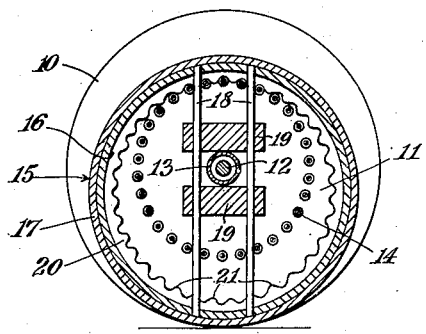
Fig. 2 is a similar diagram showing the device in operative position, eccentric to the wheel.

Referring now specifically to Figs. 1 and 2, numeral 10 indicates the tire mounted on the rim of a wheel structure, including a wheel disc 11 or the like. Disc 11 is secured to axle 12, and the latter is journaled in a suitable manner in axle housing 13. At its interior face disc 11 is provided with an endless series of power transmitting elements 14 arranged concentrically about axle 12.

Disposed normally in concentricity with tire 10 is an annulus 15 composed of a relatively stationary ring frame 16 and a virtually channel-shaped rotary ring 17, supported by and movable about the ring frame. Secured to the upper and lower portions of ring frame 16 are connectors 18 operative in guides 19, which latter are fixedly associated with the framework journaling the axle. Ring frame 16 is movable only in vertical upward or downward directions and cannot rotate. However, channel-shaped ring 17 does rotate about ring frame 16. One of the flanges 20 of ring 17 is provided with teeth or similar power transmitting elements 21 adapted for interengagement with power transmitting elements 14 when ring frame 16 is moved into the road-engaging position shown in Fig. 2. In that position the rotation of wheel disc 11 is transmitted to flanged ring 17, which will then roll over the wheel supporting surface simultaneously with tire 10, provided the tire is in condition to support the load. In the event the tire is deflated or defective, ring 17 will "take over" the support of the vehicle load.

As will be seen in comparing Figs. 1 and 2, annulus 15, composed of ring frame 16 and ring 17, does not move when in its inoperative position shown in Fig. 1, whereas ring 17 will rotate about ring frame 16 when the annulus is brought into operative, road-contacting position.

Figure 4:
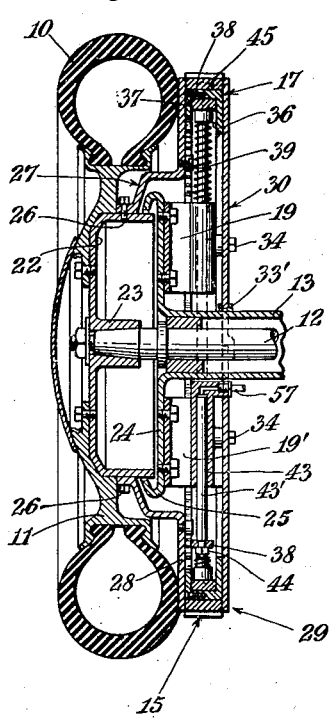
Fig. 4 is a section therethrough, taken on line 4—4 of Fig. 3.
Figure 3:
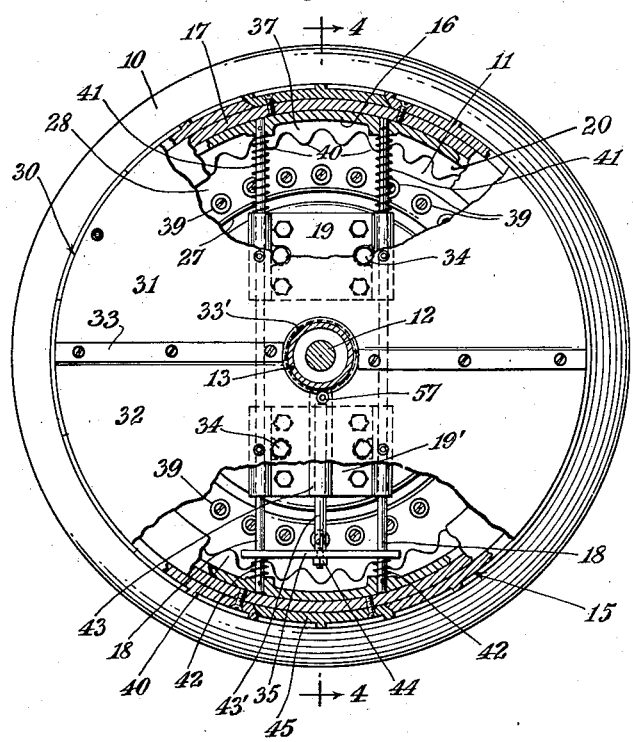
Fig. 3 is a plan view, seen from the interior side of a wheel of one structural embodiment of the present invention.

Considering now Figs. 3 and 4, there is illustrated the conventional construction of a tire 10 supported by the rim of a disc 11, which is attached to brake drum 22. The brake drum is provided with a hub 23 secured to axle 12, the latter being supported by suitable bearings in tubular axle housing 13. Forming an extension of the axle housing is a disc-shaped formation 24 provided with an inwardly turned, dust-excluding peripheral rim 25.

Secured to the brake drum between rim 25 and wheel disc 11 at 26 is a dished member 27 provided with an annular, substantially disc-shaped flange 28. Member 27 forms the outer rotary or movable portion of an annular housing 29 arranged about axle housing 13. The stationary portion of this annular housing is in the form of a disc 30, preferably composed of two overlapping semi-discs 31 and 32, secured to each other in any suitable manner, for instance as indicated at 33. Between disc 30 and shaft housing 13 there is preferably arranged a gasket 33'. Attached to and supported by the annular flange 24 of the axle housing are two guide members 19 and 19', to which is secured outer housing member 30 by means of bolts 34.

Lodged within suitable guide bores in guide members 19 and 19' are connector rods 18, which are bridged by connecting bar 35. The ends of connectors or guide bars 18 are fixedly attached to the upper and lower portions of substantially stationary ring frame 16 of annulus 15. This ring frame has a smooth outer bearing surface, or is provided with anti-friction devices such as balls or rollers, not shown in the drawings. Operative upon the bearing surface of ring frame 16 is the interior bearing surface of outer rotary ring 17, which latter preferably takes the form of and has a cross section resembling a channel. This ring is shown constructed from two portions, one having an angular cross section, as indicated in Fig. 4 at 36, the other comprising a ring-shaped element 37 which is secured by bolts 38 or otherwise to angular portion 36. The inner flange surfaces of rotary ring 17 embrace ring frame 16, and the outer flange faces are in intimate engagement with the inner faces of disc flange 28 of the movable housing portion and disc 30 of the interior or stationary housing portion. The close fit of ring 17 with the housing walls excludes the infiltration of foreign matter, such as dust and dirt, into the housing interior, thereby effectively preventing undue wear and tear of the operating portions of the device and assuring their continuous, faultless function.

Referring again to disc-like or ring-shaped flange 28 of the exterior housing portion, it will be observed that extending from the interior face thereof is an endless series of circularly disposed rollers 39. The interior flange 37 of rotary ring 17 is provided with an endless series of engaging elements in the form of teeth 40, which are adapted for interengagement with rollers 39.

Referring to the upper ends of connectors 18, there will be observed spring elements 41 interposed between the upper portion of ring frame 16 and the upper ends of guide block 19. Similar, but shorter spring elements 42 are shown interposed between the bottom portion of ring frame 16 and bar 35 bridging the lower ends of connectors 18. Spring elements 41 are intended to facilitate the suspension of ring frame 16 in its floating, inoperative, normal position, concentric with tire 10. Spring elements 42 are designed for absorbing road shocks or vibrations caused when the device is either in operative or inoperative positions, so as to simulate or approximate the rolling operation of the wheel tire.

Disposed within guide block 19' there is a hydraulic device or ram 43, comprising a cylinder and a piston 43', which engages and is fixedly connected at 44 with bridging bar 35 for connectors 18. By means of this hydraulic device, connectors 18 may be moved in vertical upward or downward directions, whereby annulus 15, composed of ring frame 16 and rotary ring 17, is bodily moved to either a concentric or eccentric position in respect to the wheel structure.

To the outer periphery of ring 17 there is detachably secured a series of antiskid road-engaging elements 45, the construction and function of which may be best perceived by consulting Figs. 5 and 6. These tread elements are designed to form a continuous tread surface. Their bodies are arcuated and of substantially arrow-shaped forms, having one end pointed, the other end being cleaved or bifurcated, as indicated, respectively at 46 and 47. Pointed end 46 is undercut at 46', while the bifurcated end is beveled correspondingly at 47' so that when the pointed end of one tread element is placed over the bifurcated end of another element, the two elements register with one another. In that position they are then attached by means of screws passing through drill holes 48. Due to the interlocking engagement of two adjacent tread elements only one screw for each element is required to hold the elements against ring member 17.

It will be observed that the outer faces of the tread elements are provided with a diamond-shaped, raised pattern, whereas the portions in which the screw-receiving holes 48 are located are below the raised faces of the pattern. Obviously, the traction-producing pattern need not be diamond-shaped, and any other suitable pattern arrangement providing the desired traction effect may be substituted.

Referring now to Figs. 7, 8 and 9, these illustrations disclose one of the many possible constructions of control means designed for convenient operation of the device. Although such control means may be located anywhere in the vehicle and may be hand operated, it is preferred to place the control on the floor and actuate it by foot. In the drawings there is shown a floor board 49, to which is hingedly secured a depressible foot pedal 50 normally held in its upward position by a spring 51. The free end of foot pedal 50 is in engagement with a spring-loaded detent 52, provided with a pedal holding notch 53. When the pedal is depressed, it moves detent 52 outwardly until it reaches notch 53, the latter holding the pedal in depressed position. In order to release the plate, detent 52 is moved by foot away from the pedal edge.

At the bottom of the pedal there is hingedly secured at 54 a rod of a hydraulic piston 55 operating in cylinder 56, which is connected by means of tubing 57 to hydraulic ram 43 of the device. When pedal 50 is depressed, the hydraulic liquid in cylinder 56 is compressed and is forced through tubing 57 into hydraulic device 43 and actuates piston 43'.

*Modification*

Referring to Figs. 10 and 11, there is disclosed a somewhat modified form of the device, which modification is very similar to the structure described in connection with Figs. 3 and 4, with the exception that the design of the outer or movable housing portion 58 is somewhat altered. It will be observed that between wheel 11 and brake drum 22 there is arranged a substantially cup-shaped member 58', which follows the outer contour of brake drum 22, but terminates in a cylindrical extension 59 provided at its edge with an endless series of perforations 60. These perforations, together with the material portions 61 separating the perforations, are intended to take the place of rollers 39 shown in Figs. 3 and 4, and to serve for accommodating teeth 40 of flange 37 which forms a part of rotary ring 17.

Secured at 62 to the outer periphery of extension 59 of cup-shaped member 58' is the angular portion of ring 63, forming the outer wall of housing 29. Thus the only change in the modified form resides in the altered construction of the outer housing portion and of the endless series of elements engageable by teeth 40.

*Operation*

Considering now Figs. 3, 4, 10 and 11 in conjunction with Figs. 7, 8 and 9, it will be observed that the annulus of the combination emergency wheel and antiskid device illustrated in these figures, normally assumes a concentric position with the wheel body, and that it is held in that position by the combined function of hydraulic ram 43 and spring elements 41 and 42 associated with the upper and lower ends of connectors or rods 18. In that concentric position annulus 15 is practically immovable, while the outer housing portions denoted in Figs. 3 and 4 at 27, and in Figs. 10 and 11 at 58, are free to rotate.

When an emergency occurs, necessitating the employment of the annulus either as a substitute for the tire or to augment traction, the operator simply depresses foot pedal 50 on the floor board, thus compressing the hydraulic liquid in cylinder 56, which in turn actuates piston 43' of hydraulic device 43. The downward movement of piston 43' causes bridging bar 35 to bear against springs 42 and to travel toward the roadbed, which movement in turn causes ring frame 16 to follow. As the ring frame 16 is thus moved in downward direction it takes with it rotary ring 17. The annulus now assumes an eccentric position to tire 10, and teeth 40 of ring 17 engage motion transmitting elements 39 or 61 shown in Figs. 3 and 11, respectively. At the same time the continuous antiskid tread secured to ring 17 engages the road, whereby the device either "takes over" or augments the weight-supporting or traction functions of tire 10.

When the device is thus placed into operative position, the vehicle will ride nearly as smoothly as if supported by the tire, since lower springs 42, associated with rods 18, will permit the device to accommodate itself to road unevennesses. These springs, incidentally, also are intended to permit an upward movement of the annulus, while held in inoperative, concentric position, when, for instance, the tire is insufficiently inflated or when it rides over sudden obstructions, the design of these springs being such that their compressibility corresponds to the pressure in the inflated tire.

While in the illustrations specific structural details are disclosed, they are shown and described for the purpose of elucidating the basic features of the present invention, and are by no means intended to restrict the latter to the detail construction, since changes, variations and improvements may be readily incorporated therein, without affecting its working principle. Inasmuch as the present device is applicable to all types of vehicles, changes and modifications are practically unavoidable in order to meet different requirements, it being understood that such changes and modifications are to be considered to lie within the broad scope of the invention, as defined in the annexed claims.

I claim:

1. In an emergency wheel and antiskid device for vehicle wheels, a housing comprising stationary and movable portions, the latter portion forming a fixed part of the vehicle wheel body, the stationary portion being fixedly associated with the wheel axle supporting frame work, a substantially ring-shaped structure operative within the housing but being normally stationary and in concentricity with the vehicle wheel, connectors extending from the upper to the lower portion of said ring-shaped structure, guide means for said connectors fixedly secured to the wheel axle supporting framework, spring elements interposed between said guide means and the upper and lower portions of said ring structure, an operating mechanism for the ring structure arranged within the housing and being adapted to move the ring structure into contact with the wheel supporting surface and to an eccentric position relative to the vehicle wheel, said spring elements being adapted to render the ring structure sufficiently responsive in its rolling movement over a supporting surface to approximate the usual or normal rolling function of the vehicle wheel.

2. In a device for the purpose indicated, a circular housing, designed to exclude foreign matter, disposed adjacent to and concentric with a vehicle wheel and comprising an outer rotary portion, forming a part of the removable wheel structure, and an inner, stationary portion, secured to the wheel axle frame work, an annulus bodily movable between the housing portions comprising non-rotating and rotary members, and being normally stationary and disposed concentrically with the the vehicle wheel, the rotary member being adapted for engagement with the wheel supporting surface, when the annulus is moved downwardly, connectors extending from the upper to the lower portion of the non-rotating annulus member, fixed guide means for said connectors, spring elements interposed between said guide means and the upper and lower portions of said non-rotating member, an actuating mechanism for said annulus disposed within the housing and being adapted to move the annulus to an eccentric position in respect to the vehicle wheel and into an engaging position with the wheel supporting surface, said spring elements being adapted to so hold the annulus under tension that it will approximate the normal rolling movement of a vehicle wheel over such surface, the outer, road-engaging tread surface of the annulus being continuous.

3. In a device as per claim 2, said non-rotating member of the annulus forming a ring-shaped inner or operating frame associated with and operative by said actuating mechanism, said rotary member comprising a substantially channel-shaped ring rollably mounted upon said frame, and a continuous antiskid tread portion removably secured to said ring, one flange of the channel-shaped ring being provided with an endless series of power transmitting elements, said outer rotary portion of the housing having an annular arrangement of corresponding elements adapted for the reception of and engagement with said flange elements and for transmitting the rotary motion of the wheel to said channel-shaped ring when the entire annulus is bodily moved by said actuating mechanism toward the wheel supporting surface and to an eccentric position in respect to the vehicle wheel.

4. In a device of the class indicated, the combination with a vehicle wheel structure and its axle frame work, of a housing having movable and stationary, substantially disc-shaped portions adapted to exclude foreign matter from the housing interior, the movable housing portion being associated with the vehicle wheel, the stationary portion being secured to the axle frame work, an annulus disposed between and being operative relative to said housing portions and being normally in concentric position in respect to the vehicle wheel, said annulus comprising an inner ring member, restricted to vertical reciprocating movements, and an outer ring member peripherally engaging and rotatable in respect to the inner ring member, said outer ring member having exchangeable, continuous tread means at its outer face, and an endless series of engaging elements at its interior periphery, a series of corresponding engaging elements provided with the movable housing portion and being adapted for the reception of and the engagement with the elements of the outer ring member, an actuating mechanism within the housing adapted to bring the elements of the outer ring member into operative engagement with the elements of the movable housing portion and to simultaneously force the tread means of the outer ring member against the wheel supporting surface, thereby augmenting traction for and relieving load carried by the vehicle wheel.

5. In a device as per claim 4, said actuating mechanism comprising hydraulically operated connectors associated with said inner ring member and guide means for said connectors adapted to restrict their movement in vertical directions, and springs associated with said connectors and bearing against the upper and lower portions of said inner ring member.

6. In a device of the class indicated, a wheel axle supporting frame, a wheel axle journaled therein, a vehicle wheel structure removably supported by the axle and including a brake drum and wheel body, a housing having movable and fixed substantially disc-shaped portions, the movable portion being associated with the wheel structure, and having an endless series of power transmitting means at its interior, the fixed portion being secured to the frame, a substantially annular mechanism operative between the two housing portions and being adapted to normally assume a position concentric with the wheel, while in inoperative position, and to move to an eccentric, operative position, and to engage the wheel supporting surface, said mechanism comprising a non-rotary ring frame, connectors secured at the top and bottom portions thereof, fixed guide means for the connectors arranged above and below the wheel axle frame, a bridging member provided with the connectors, hydraulic means engaging said bridging member, spring elements associated with said connectors, some of the spring elements bearing against the upper portion of the ring frame, other spring elements being interposed between the bridging member and the lower ring frame portion, said hydraulic means being adapted to impart vertical movements to said ring frame by way of said bridging member, said connectors and said spring elements, a substantially channel-shaped annulus embracing and being rotatable about said ring frame and having its channel flanges directed radially inwards, one of its flanges being provided with an endless series of power transmitting elements adapted for engagement with power transmitting means arranged at the movable housing portion, the downward movement of the ring frame, caused by said hydraulic means, effecting the interengagement between said power transmitting elements of the annulus and the power transmitting means of the movable housing portion, and exchangeable, antiskid tread means associated with the annulus.

7. In a device as per claim 6, said tread means comprising substantially arrow-shaped elements having pointed and cleaved ends, the pointed ends having undercut, beveled engaging edges, the cleaved ends having correspondingly beveled edges adapted for the reception of and the interengagement with the undercut beveled edges of the pointed element ends.

8. In a device as per claim 6, said tread means comprising a plurality of individual, interengageable elements forming a continuous antiskid tread surface when in position.

OTTO SCHLETT.

REFERENCES CITED

The following references are of record in the file of this patent:

UNITED STATES PATENTS

| Number | Name | Date |
| --- | --- | --- |
| 993,858 | Maurer | May 30, 1911 |
| 2,273,663 | Robert | Feb. 17, 1942 |

FOREIGN PATENTS

| Number | Country | Date |
| --- | --- | --- |
| 403,006 | Great Britain | Dec. 14, 1933 |